US011822046B2

(12) United States Patent
Shi et al.

(10) Patent No.: US 11,822,046 B2
(45) Date of Patent: Nov. 21, 2023

(54) METHOD FOR CALCULATING SAFE DRILLING FLUID DENSITY IN FRACTURED FORMATION

(71) Applicant: Southwest Petroleum University, Chengdu (CN)

(72) Inventors: Xiangchao Shi, Chengdu (CN); Leiyu Gao, Chengdu (CN); Jianfeng Liu, Chengdu (CN); Hao Yu, Chengdu (CN); Yuting Dai, Chengdu (CN); Xiuping Chen, Chengdu (CN); Qingling Li, Chengdu (CN); Shuanggui Li, Chengdu (CN); Yuming Wang, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 18/118,229

(22) Filed: Mar. 7, 2023

(65) Prior Publication Data

US 2023/0280493 A1 Sep. 7, 2023

(30) Foreign Application Priority Data

Mar. 7, 2022 (CN) .......................... 202210216104.0

(51) Int. Cl.
*G01V 99/00* (2009.01)
*G06F 30/28* (2020.01)
(Continued)

(52) U.S. Cl.
CPC ............ *G01V 99/005* (2013.01); *E21B 41/00* (2013.01); *E21B 49/00* (2013.01); *G06F 30/28* (2020.01);
(Continued)

(58) Field of Classification Search
CPC .................. G01V 99/005; G06F 30/28; G06F 2111/10; E21B 41/00; E21B 49/00; E21B 2200/20
(Continued)

(56) References Cited

FOREIGN PATENT DOCUMENTS

CN 110259443 A 9/2019

OTHER PUBLICATIONS

Chen et al., Well path optimization based on wellbore stability analysis. Natural Gas Industry. vol. 35, pp. 84-92, Oct. 25, 2015.
(Continued)

*Primary Examiner* — John E Johansen
(74) *Attorney, Agent, or Firm* — NIELDS, LEMACK & FRAME, LLC

(57) ABSTRACT

The present disclosure discloses a method for calculating a safe drilling fluid density in a fractured formation, including the following steps: S1, performing image processing to identify a downhole fracture; S2, establishing three-dimensional (3D) geological models based on parameters of the downhole fracture, and establishing a drilling wellbore model based on a size and length of a wellbore; S3, assigning the model with material parameters, boundary conditions, and upper and lower bounds of an initial drilling fluid density, and calculating accuracy; S4, solving the 3D geological models using a 3-dimension distinct element code (3DEC) and determining stability of a well wall; S5, determining upper and lower bounds of a drilling fluid density using dichotomy; S6, repeating steps S4 to S5; and S7, after set accuracy conditions are reached, saving and outputting the safe drilling fluid density.

4 Claims, 13 Drawing Sheets

(51) Int. Cl.
  *E21B 41/00* (2006.01)
  *E21B 49/00* (2006.01)
  *G06F 111/10* (2020.01)

(52) U.S. Cl.
  CPC ....... *E21B 2200/20* (2020.05); *G06F 2111/10* (2020.01)

(58) Field of Classification Search
  USPC .......................................................... 703/10
  See application file for complete search history.

(56) References Cited

OTHER PUBLICATIONS

Chinese communication, with English translation, dated Aug. 1, 2022 in corresponding Chinese patent application No. 202210216104.0.

Chinese communication, with English translation, dated Oct. 18, 2022 in corresponding Chinese patent application No. 202210216104.0.

(a)

(b)

(a)

(b)

(a)

(b)

(c)

(a)

(b)

METHOD FOR CALCULATING SAFE DRILLING FLUID DENSITY IN FRACTURED FORMATION

CROSS REFERENCE TO RELATED APPLICATION

This patent application claims the benefit and priority of Chinese Patent Application No. 202210216104.0, filed with the China National Intellectual Property Administration on Mar. 7, 2022, the disclosure of which is incorporated by reference herein in its entirety as part of the present application.

TECHNICAL FIELD

The present disclosure relates to the fields of drilling practice in oil and natural gas engineering, geothermal drilling and deep earth scientific exploration, and in particular, to a method for calculating a safe drilling fluid density in a fractured formation.

BACKGROUND

With the development of oil and gas engineering, the drilling is carried out in deeper and deeper positions. The formation encountered in drilling is often not a complete rock, but a rock mass containing a structural plane. This problem is particularly prominent when drilling into fractured zones, faults and fractures. The drilling wellbore need to be supported by drilling fluid pressure, otherwise problems such as wall necking and collapse occur. This leads to problems such as sticking of drilling tools and burying of drilling tubes. In serious cases, the whole wellbore is scrapped.

Therefore, the safe drilling fluid pressure or density required for drilling plays a decisive role in the success of drilling engineering. Generally speaking, for current calculation of drilling fluid density, the well-wall stress is calculated using the theory of continuous medium. By studying the influence of different drilling fluid densities on the well-wall stability, the required drilling fluid density is calculated using the dichotomy or Newton iteration method. The common calculation process is as follows:

1. The well-wall stress is calculated using the Farihurst equation.
2. The well-wall stability is determined using the Mohr-Coulomb strength criterion.
3. The drilling fluid density is calculated using the dichotomy or Newton iteration method.

Due to different basic assumptions and theories, it is impossible to consider the effects of factors such as geometric occurrence of the formation on the well-wall stability and the drilling fluid density when drilling into formations such as fractured zones, faults, fractures. Therefore, the above method is not completely applicable to the calculation of a drilling fluid density in drilling engineering in fractured zones, faults and fractured formations.

SUMMARY

An objective of the present disclosure is to provide a method for calculating a safe drilling fluid density in a fractured formation, which more accurately calculates the drilling fluid density in fractured zones, faults and fractured formations and more excellently guides drilling engineering in the fractured formations.

The objective of the present disclosure is achieved by the following technical solutions.

A method for calculating a safe drilling fluid density in a fractured formation includes the following steps:

S1, performing image processing to identify a downhole fracture;

S2, establishing three-dimensional (3D) geological models based on parameters of the downhole fracture, and establishing a drilling wellbore model based on a size and length of a wellbore;

S3, assigning the model with material parameters, boundary conditions, and upper and lower bounds of an initial drilling fluid density, and calculating accuracy;

S4, solving the 3D geological models using a 3-dimension distinct element code (3DEC) and determining stability of a well wall;

S5, determining upper and lower bounds of a drilling fluid density using dichotomy;

S6, repeating steps S4 to S5; and

S7, after set accuracy conditions are reached, saving and outputting the safe drilling fluid density.

Further, step S1 is specifically as follows: converting a formation logging imaging to a gray image and obtaining a gray color histogram, processing the gray image by a segmentation algorithm such as a threshold method to obtain a binary image, picking up and determining high and low point coordinates of the fracture, and obtaining the parameters of the fracture by an equation. An equation of the high and low point coordinates and the parameters of the fracture is as follows.

A two-dimensional plane fracture equation is as follows:

$$z = Ax + By + C \tag{1}$$

where z is a height, in m; x and y are X and Y coordinates respectively; and A, B and C are plane control parameters.

A wellbore equation is as follows:

$$\begin{cases} x = r\cos\theta \\ y = r\sin\theta \end{cases}, \tag{2}$$

where x and y are the X and Y coordinates respectively; r is a radius of the wellbore, in m; and $\theta$ is a round angle of a well, in rad.

A fracture curve function in a form of trigonometric function curve on the well wall is obtained by a sum of the equations, as shown in the following equation:

$$z = \sqrt{B^2 r^2 + A^2 r^2} \sin\left(\theta + \arctan\frac{A}{B}\right) + C, \tag{3}$$

where A, B and C are the plane control parameters; z is the height, in m; r is the radius of the wellbore, in m; and $\theta$ is the round angle of the well, in rad.

If the high point coordinates H (x0, y0) and the low point coordinates L (x1, y1) are given, the equation is rewritten as follows:

$$z(\theta) = \frac{y_0 - y_1}{2}\sin\left(\theta + \frac{\pi}{2} - x_0\right) + \frac{y_0 + y_1}{2}, \tag{4}$$

where $\theta$ is the round angle of the well, in rad; z is the height, in m; and $x_0$ and $y_0$ are the high point coordinates, and $x_1$ and $y_1$ are the low point coordinates.

A dip angle, azimuth, inclination and curve length in the parameters of the fracture are respectively shown in the following equations:

$$\alpha = \arctan\left(\frac{y_0 - y_1}{2r}\right), \quad (5)$$

$$\beta = \min(x_0, x_1), \quad (6)$$

$$\lambda = \beta + \frac{\pi}{2}, \text{ and} \quad (7)$$

$$l = \int_0^{2\pi} \sqrt{1 + (z')^2}\, dx, \quad (8)$$

where $\alpha$ is the dip angle, in rad; $\beta$ is the azimuth, in rad; $\lambda$ is the inclination, in rad; and l is the curve length, in m.

Further, step S2 is as follows: obtaining the parameters of the fracture through processing to construct a plane fracture model, and constructing the formation wellbore model by using the size of the wellbore, where the wellbore model is a cuboid wellbore model, and a wellbore radius of the wellbore model is the same as an actual wellbore radius; and a length of the cuboid wellbore model depends on a length of the model, a width of the cuboid wellbore model is greater than 3 times a wellbore diameter, and in order to meet the accuracy conditions and fast solution operation, a multiple is set to 5 times.

Further, step S3 is as follows: assigning formation material parameters in the 3DEC, including an elastic modulus, a Poisson's ratio, a density, a friction angle, cohesion and tensile strength; assigning mechanical parameters to the fracture, including normal stiffness and shear stiffness; assigning the boundary conditions to the model, including maximum horizontal principal stress, minimum horizontal principal stress, vertical stress, initial stress, a boundary displacement, and upper and lower bounds of the drilling fluid density; and setting solution accuracy of the dichotomy and determining a number of iterations n, where an equation for the number of iterations is as follows:

$$|x^* - x_k| \le \frac{(b-a)}{2^{k+1}} < \varepsilon, \quad (9)$$

where x* is true; $X_k$ is a calculated value of a k-th iteration; b is the upper bound of the drilling fluid density; a is the lower bound of the drilling fluid density; and c is the solution accuracy.

Further, step S4 is as follows: determining the drilling fluid density ρ using the 3DEC, where ρ is half the sum of the upper bound of the drilling fluid density and the lower bound of the drilling fluid density; setting a solution step and run the model until a maximum unbalance force remains unchanged or zero; and after software solution, determining whether a well wall unit meets stability conditions through processing, where decision conditions are set as follows:

(1) if a centroid position of the unit is less than a position threshold 1, a number of yield units is less than a threshold 2;
(2) if the centroid position of the unit is less than the position threshold 1, a maximum horizontal displacement of the well wall unit is less than a threshold 3; and
(3) if the centroid position of the unit is less than the position threshold 1, the number of yield units is less than the threshold 2 and the maximum horizontal displacement of the well wall unit is less than the threshold 3.

Furthermore, in step S5, according to the decision conditions, if the decision conditions are true, the upper bound of the drilling fluid density is a current drilling fluid density of the model, and the lower bound of the drilling fluid density is a lower bound of the current drilling fluid density of the model. If the decision conditions are false, the upper bound of the drilling fluid density is an upper bound of the current drilling fluid density of the model, and the lower bound of the drilling fluid density is the current drilling fluid density of the model. Then, the upper and lower bounds of the drilling fluid density are updated.

Furthermore, step S6 is as follows: determining the drilling fluid density of the model according to the upper and lower bounds of the drilling fluid density; and recalling the model and performing steps S4 to S5 for n−1 times.

The present disclosure has the following beneficial effects:

The method for calculating a safe drilling fluid density in a fractured formation provided by the present disclosure can accurately calculate the wellbore stability of the fractured formation and determine the safe drilling fluid density of the fractured formation according to the discrete element method based on the formation logging imaging.

BRIEF DESCRIPTION OF THE DRAWINGS

FIG. 2A shows an original logging imaging,
FIG. 2B shows a gray image of the original logging imaging,
FIG. 2C shows a binary image of the original logging imaging,
and FIG. 2D shows a diagram of a fractured well wall in a form of trigonometric function after image processing;
FIG. 3A is a fracture model and FIG. 3B is a final operational model;
FIG. 4A shows an original operational model,
FIG. 4B shows calculation after 7 iterations,
and FIG. 4C shows presentation of a failure unit on the well wall;
FIG. 5A shows an original operational model,
FIG. 5B shows calculation after 7 iterations,
and FIG. 5C shows presentation of a failure unit on the well wall.

DETAILED DESCRIPTION OF THE EMBODIMENTS

Figure 1:
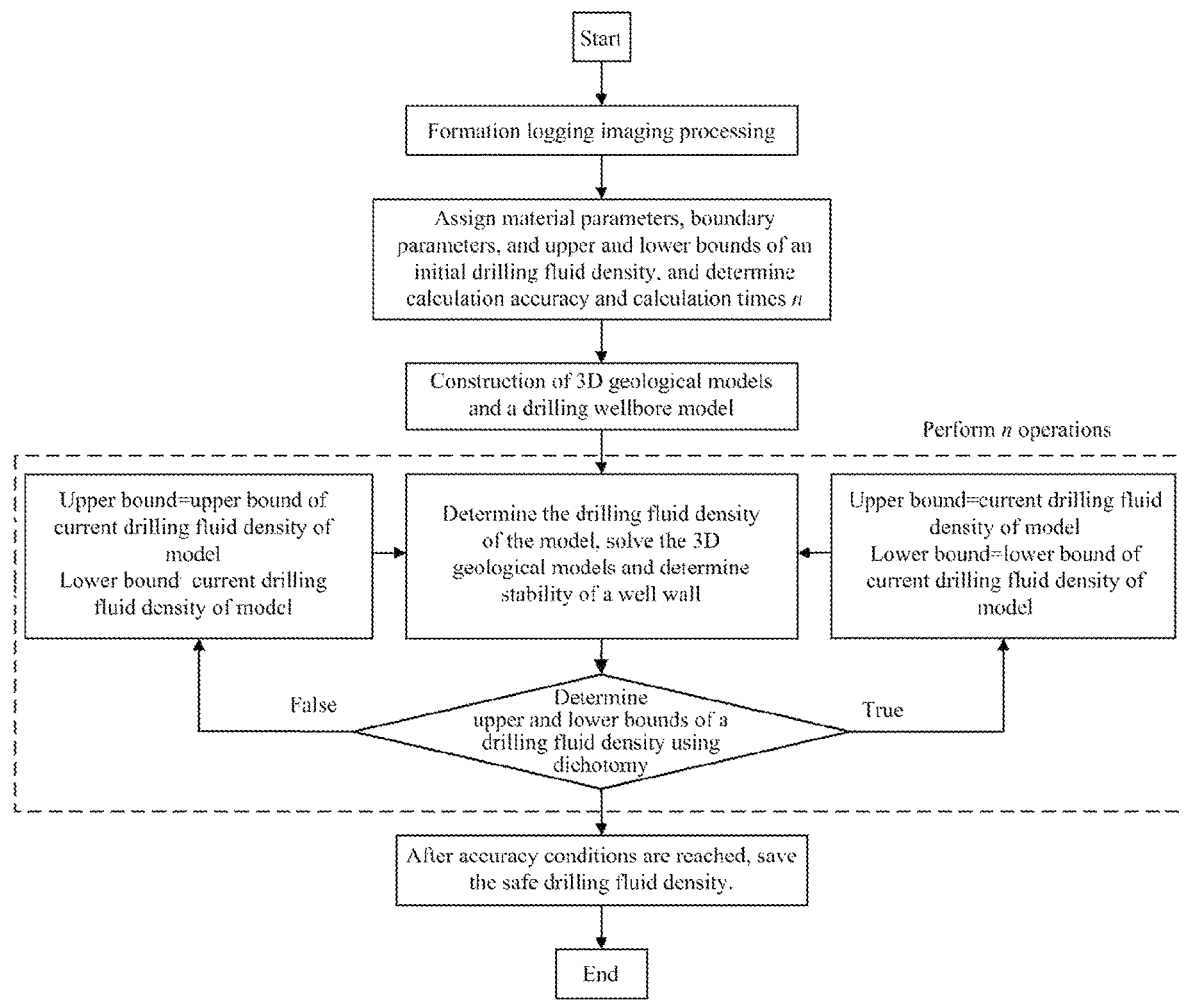
FIG. 1 is a flow block diagram of the present disclosure.

In order to describe the technical features, objectives and effects of the present disclosure more clearly, the specific implementations of the present disclosure are described in detail below with reference to the accompanying drawings.

Embodiment I. In the present embodiment, as shown in FIG. 1 to FIG. 5A-C, a method for calculating a safe drilling fluid density in a fractured formation includes the following steps.

S1, Image processing is performed to identify a downhole fracture.
S2, 3D geological models are established based on parameters of the downhole fracture, and a drilling wellbore model is established based on a size and length of a wellbore.

S3, The model is assigned with material parameters, boundary conditions, and upper and lower bounds of an initial drilling fluid density, and accuracy is calculated.

S4, The 3D geological models are solved using a 3DEC and stability of a well wall is determined.

S5, Upper and lower bounds of a drilling fluid density using dichotomy are determined.

S6, Steps S4 to S5 are repeated.

S7, After set accuracy conditions are reached, the safe drilling fluid density is saved and output.

Further, step S1 is specifically as follows: a formation logging imaging is converted to a gray image and a gray color histogram is obtained. The gray image is processed by a segmentation algorithm such as a threshold method to obtain a binary image. High and low point coordinates of the fracture are picked up and determined. The parameters of the fracture are obtained by an equation. An equation of the high and low point coordinates and the parameters of the fracture is as follows.

A two-dimensional plane fracture equation is as follows:

$$z = Ax + By + C \tag{1}$$

where z is a height, in m, x and y are X and Y coordinates respectively, and A, B and C are plane control parameters.

A wellbore equation is as follows:

$$\begin{cases} x = r\cos\theta \\ y = r\sin\theta \end{cases} \tag{2}$$

where x and y are the X and Y coordinates respectively, r is a radius of the wellbore, in m, and $\theta$ is a round angle of a well, in rad.

A fracture curve function in a form of trigonometric function curve on the well wall is obtained by a sum of the equations, as shown in the following equation:

$$z = \sqrt{B^2 r^2 + A^2 r^2} \sin\left(\theta + \arctan\frac{A}{B}\right) + C, \tag{3}$$

where A, B and C are the plane control parameters, z is the height, in m, r is the radius of the wellbore, in m, and $\theta$ is the round angle of the well, in rad.

If the high point coordinates H (x0, y0) and the low point coordinates L (x1, y1) are given, the equation is rewritten as follows:

$$z(\theta) = \frac{y_0 - y_1}{2} \sin\left(\theta + \frac{\pi}{2} - x_0\right) + \frac{y_0 + y_1}{2}, \tag{4}$$

where $\theta$ is the round angle of the well, in rad, z is the height, in m, $x_0$ and $y_0$ are the high point coordinates, and $x_1$ and $y_1$ are the low point coordinates.

A dip angle, azimuth, inclination and curve length in the parameters of the fracture are respectively shown in the following equations:

$$\alpha = \arctan\left(\frac{y_0 - y_1}{2r}\right), \tag{5}$$

$$\beta = \min(x_0, x_1), \tag{6}$$

$$\lambda = \beta + \frac{\pi}{2}, \text{ and} \tag{7}$$

$$l = \int_0^{2\pi} \sqrt{1 + (z')^2}\, dx, \tag{8}$$

where $\alpha$ is the dip angle, in rad, $\beta$ is the azimuth, in rad, $\lambda$ is the inclination, in rad, and l is the curve length, in m.

Image processing pseudo-code:

| Image processing pseudo-code or function | Description |
| --- | --- |
| 1  Well_diameter | Wellbore diameter |
| 2  Well_length | Wellbore length |
| 3  Image = Imread('---') | Read an image |
| 4  Gray_image = Rgb2gray(Image) | Convert a color image to a gray image |
| 5  Imhist(Gray_image) | Show a gray image histogram |
| 6  Threshold = Imput(threshold) | Input a segmentation threshold |
| 7  Bin_Image = Imbinarize(Threshold) | Threshold segmentation |
| 8  [x,y] = Ginput | Select a fracture with a mouse |
| 9  Equation (4)-Equation (8) | Use Equation (4) to Equation (8) to calculate parameters |
| 10  xlswrite(results) | Output data |
| 11  Save | Save data |

The present embodiment is further set as: step S2 is as follows: the parameters of the fracture are obtained through processing to construct a plane fracture model, and a formation wellbore model is constructed by using the size of the wellbore. The wellbore model is a cuboid wellbore model, and a wellbore radius of the wellbore model is the same as an actual wellbore radius. A length of the cuboid wellbore model depends on a length of the model, a width of the cuboid wellbore model is greater than 3 times a wellbore diameter, and in order to meet the accuracy conditions and fast solution operation, a multiple is set to 5 times.

The 3D geological models and the drilling wellbore model are established through the 3DEC. The operation pseudo-code is as follows:

| 3DEC modeling pseudo-code or function | Description |
| --- | --- |
| 1  Poly tunnel | Establish a 3D cuboid that meets the size |
| 2  Delete range cy | Delete a cylinder and construct a wellbore model |
| 3  Jset | Construct plane fractures with different occurrences |
| 4  ... | Construct plane occurrences fractures with different |
| 5  Jset | Construct plane fractures occurrences with different |
| 6  gen | Grid division |
| 7  Save model | Save a model |

The present embodiment is further set as: step S3 is as follows: formation material parameters are assigned in the 3DEC, including an elastic modulus, a Poisson's ratio, a density, a friction angle, cohesion and tensile strength. Mechanical parameters are assigned to the fracture, including normal stiffness and shear stiffness. The boundary conditions are assigned to the model, including maximum horizontal principal stress, minimum horizontal principal stress, vertical stress, initial stress, a boundary displacement, and upper and lower bounds of the drilling fluid density. A solution accuracy of the dichotomy is set and a number of iterations n is determined. An equation for the number of iterations is as follows:

$$|x^* - x_k| \le \frac{(b-a)}{2^{k+1}} < \varepsilon, \qquad (9)$$

where x* is true, $X_k$ is a calculated value of a k-th iteration, b is the upper bound of the drilling fluid density, a is the lower bound of the drilling fluid density, and c is the solution accuracy.

The operation pseudo-code is as follows:

| | 3DEC modeling pseudo-code or function | Description |
|---|---|---|
| 1 | Property mat | Assign rock matrix parameters |
| 2 | Property jmat | Assign fracture parameters |
| 3 | Insitu stress | Assign initial in-situ stress |
| 4 | Bound stress | Assign boundary stress |
| 5 | Bound stress | Assigned a bottom-hole pressure of drilling fluid |
| 6 | Bound xvel | Assign a displacement boundary |
| 7 | Ini disp | Assign an initial displacement |
| 8 | Ini xvel | Assign an initial velocity |

The present embodiment is further set as: step S4 is as follows: the drilling fluid density ρ is determined using the 3DEC, where ρ is half the sum of the upper bound of the drilling fluid density and the lower bound of the drilling fluid density. Set a solution step and run the model until a maximum unbalance force remains unchanged or zero. After software solution, whether a well wall unit meets stability conditions is determined through processing. Decision conditions are set as follows.

(1) If a centroid position of the unit is less than a position threshold 1, a number of yield units is less than a threshold 2.
(2) If the centroid position of the unit is less than the position threshold 1, a maximum horizontal displacement of the well wall unit is less than a threshold 3.
(3) If the centroid position of the unit is less than the position threshold 1, the number of yield units is less than the threshold 2 and the maximum horizontal displacement of the well wall unit is less than the threshold 3.

S4, The 3D geological models are solved using a discrete element method and stability of a well wall is determined. The 3DEC operation pseudo-code is as follows:

| | 3DEC modeling pseudo-code or function | Description |
|---|---|---|
| 1 | open | Read upper and lower bounds of a drilling fluid density |
| 2 | Restore model | Call up an original model and a function in step S3 |
| 3 | Step | Set an operation step |
| 4 | Save model_result | Save a calculated model |
| | Loop while | Loop through all computing units |
| 5 | If zone(radius) < threshold1 | True if well wall conditions are met |
| 6 | If zone(state) < threshold2 | True if the unit state meets the conditions |
| 7 | Failure = Failure+1 | Determine a number of unit failures |
| 8 | Endif | |
| 9 | Endif | |
| 10 | Endloop | End loop |

The present embodiment is further set as: in step S5, according to the decision conditions, if the decision conditions are true, the upper bound of the drilling fluid density is a current drilling fluid density of the model, and the lower bound of the drilling fluid density is a lower bound of the current drilling fluid density of the model. If the decision conditions are false, the upper bound of the drilling fluid density is an upper bound of the current drilling fluid density of the model, and the lower bound of the drilling fluid density is the current drilling fluid density of the model. The upper and lower bounds of the drilling fluid density are updated. That is, in the computer program, the new upper/lower bounds of the drilling fluid density replaces the old upper/lower bounds of the drilling fluid density.

S5, Upper and lower bounds of a drilling fluid density are determined using dichotomy. The operation pseudo-code is as follows:

| | 3DEC modeling pseudo-code or function | Description |
|---|---|---|
| 1 | If condition | Model stability condition |
| 2 | stability = 1 | Model stability is true |
| 3 | Else | |
| 4 | stability = 0 | Model stability is false |
| 5 | end | |
| 6 | If stability = 1 | If the well wall stability is true |
| 7 | Pressureup=wellbore_Pressure | The upper bound of the drilling fluid density is equal to the current drilling fluid density of the model |
| 8 | Pressuredown = Pressuredown | The lower bound of the drilling fluid density is equal to the lower bound of the current drilling fluid density of the model |
| 9 | Else | If the well wall stability is false |
| 10 | Pressureup= Pressureup | The upper bound of the drilling fluid density is equal to the upper bound of the current drilling fluid density of the model |
| 11 | Pressuredown=wellbore_Pressure | The lower bound of the drilling fluid density is equal to the current drilling fluid density of the model |
| 12 | Endif | |
| 13 | Save .dat | Save the upper and lower bounds of the drilling fluid density |

The present embodiment is further set as: step S6 is as follows: the drilling fluid density of the model is determined according to the upper and lower bounds of the drilling fluid density. The model is recalled and steps S4 to S5 are performed for n−1 times. The operation pseudo-code is as follows:

|   | 3DEC modeling pseudo-code or function | Description |
|---|---|---|
| 1 | S4 code | Execute S4 code for the 2nd times |
| 2 | S5 code | Execute S5 code for the 2nd times |
| 3 | ... | |
| 4 | S4 code | Execute S4 code for the n-th times |
| 5 | S5 code | Execute S5 code for the n-th times |

Step S7, After the accuracy conditions are reached, the safe drilling fluid density is saved and output.

Embodiment II. The characteristics and performance of the present disclosure are further described in detail by taking a 8,400-8,404 m section of a fractured formation of a well as an example.

Step S1, Image processing is performed to identify a downhole fracture.

Figure 2A:
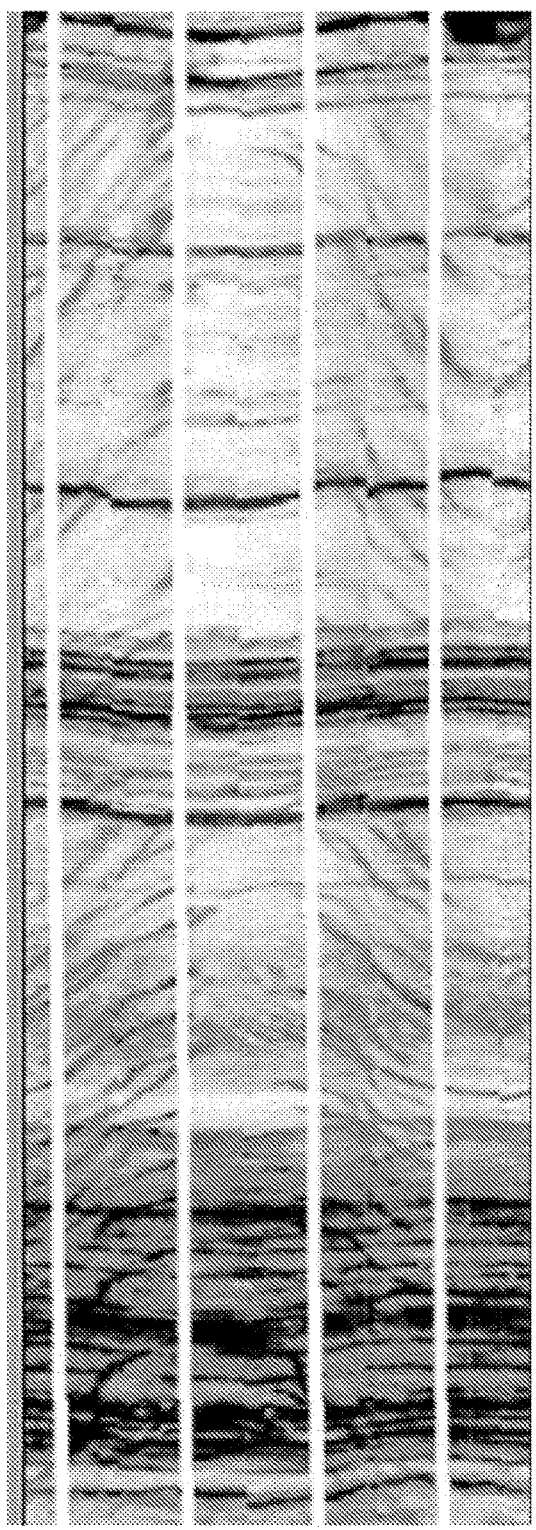
FIG. 2A-D show diagrams of image processing results in Embodiment 1, where
Figure 2B:
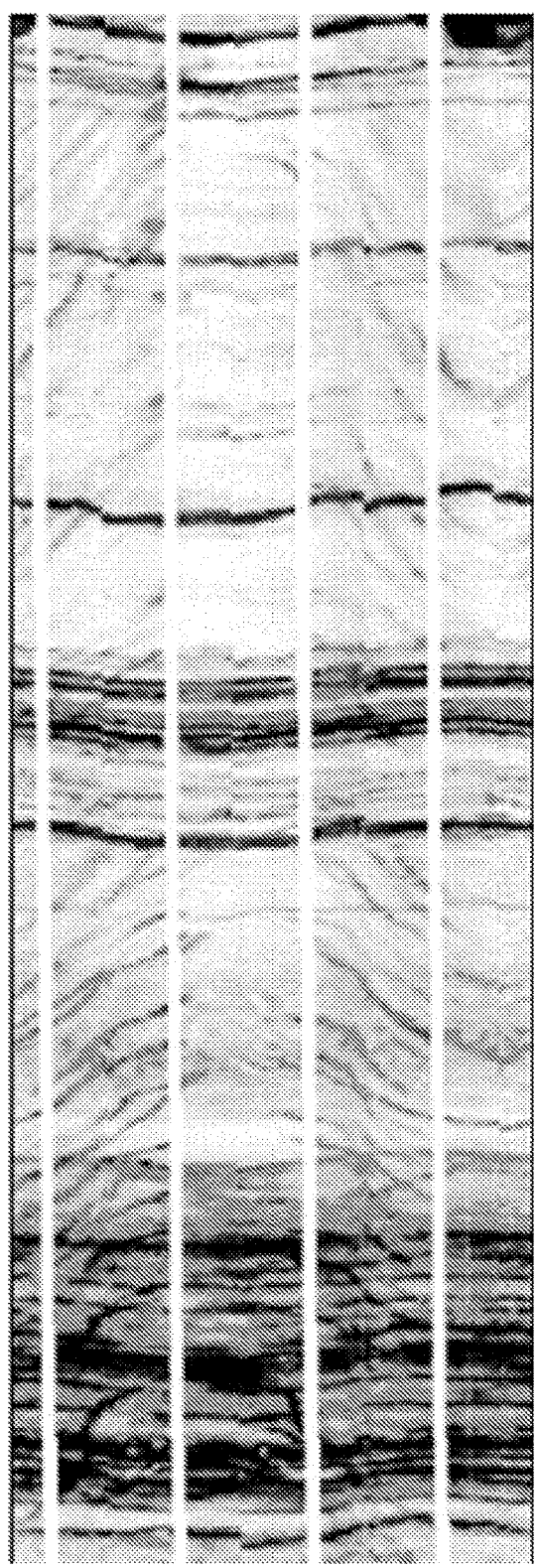
Figure 2C:
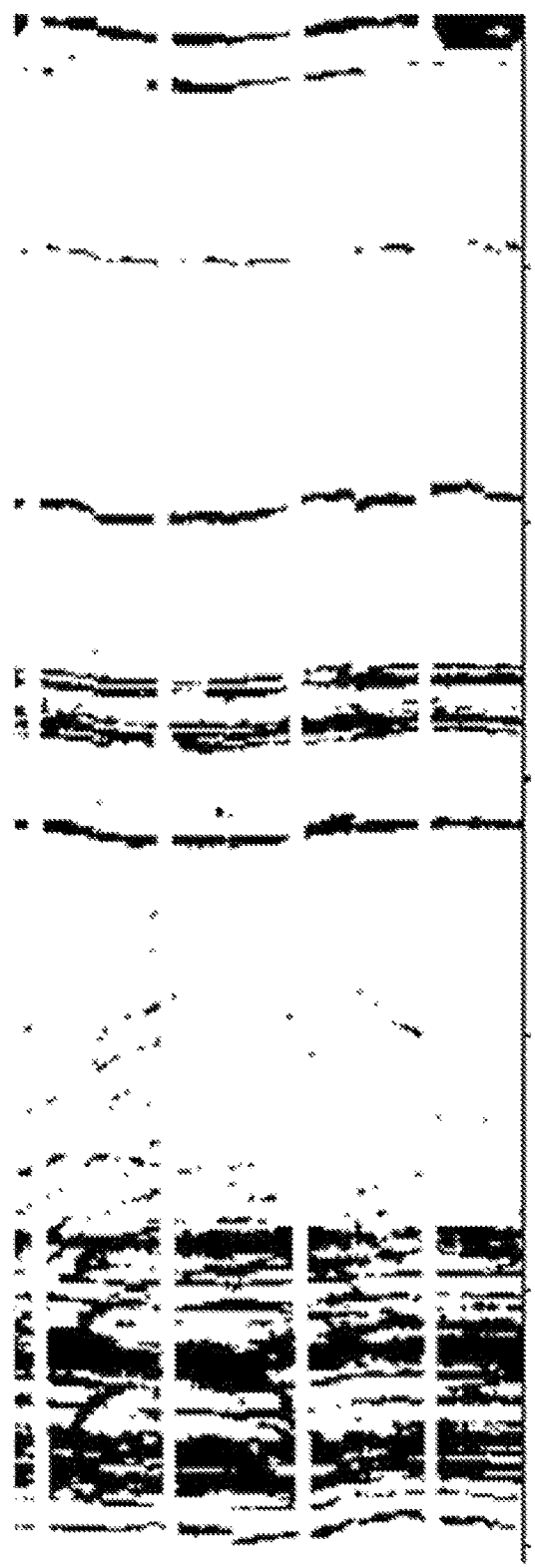
Figure 2D:
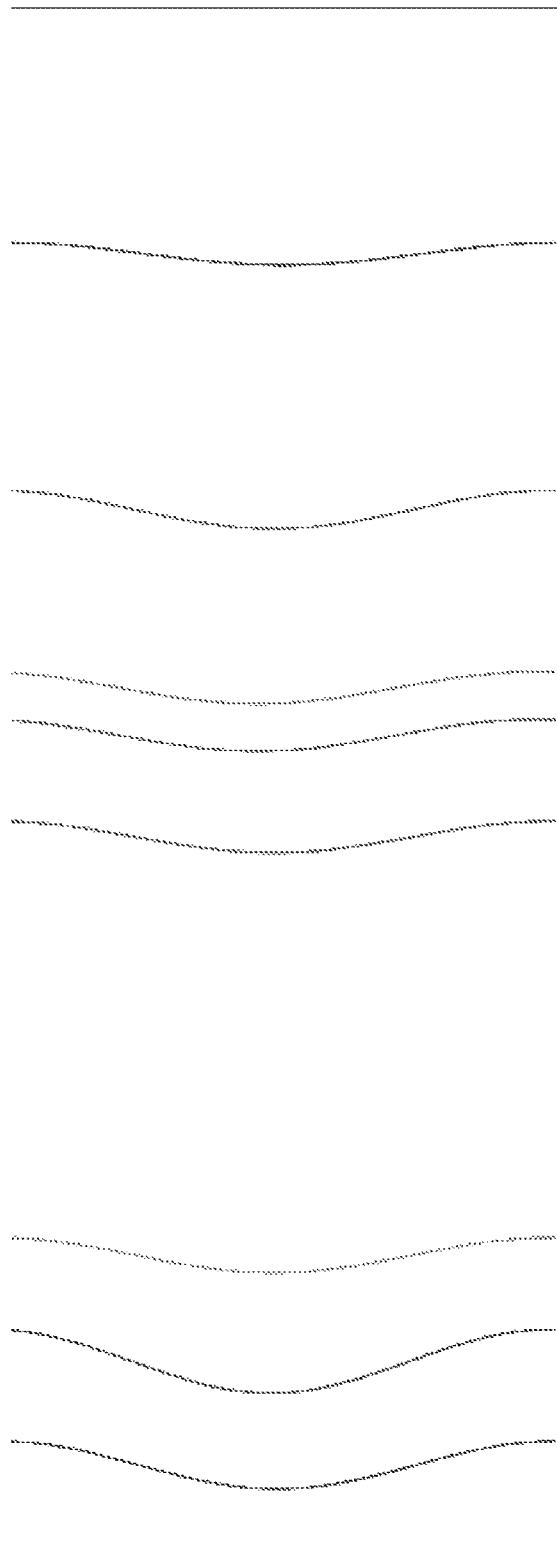

The image processing pseudo-code or function in S1 is executed, a wellbore diameter of 0.075 and a wellbore length of 4 m are input, and imaging logging images are read, as shown in FIG. 2A. The imaging logging image is converted to a gray image using the rgb2gray function, as shown in FIG. 2B. A threshold 100 is input, and the image is segmented to obtain a binary image, as shown in FIG. 2C. The fracture is identified on the image, and the maximum point and minimum point of trigonometric function curve are selected with the mouse to obtain geometric parameters of the fracture.

|   | Image processing pseudo-code or function | Description |
|---|---|---|
| 1 | Well_diameter | Wellbore diameter |
| 2 | Well_length | Wellbore length |
| 3 | Image = Imread('---') | Read an image |
| 4 | Gray_image = Rgb2gray(Image) | Convert a color image to a gray image |
| 5 | Imhist(Gray_image) | Show a gray image histogram |
| 6 | Threshold = Imput(threshold) | Input a segmentation threshold |
| 7 | Bin_Image = Imbinarize(Threshold) | Threshold segmentation |
| 8 | [x,y] = Ginput | Select a fracture with a mouse |
| 9 | Equation (4) – Equation (8) | Use Equation (4) to Equation (8) to calculate parameters |
| 10 | Xlswrite(results) | Output data |
| 11 | Save | Save data |

The fracture parameters are shown in Table 1:

TABLE 1

| Fracture number | Dip angle (°) | Azimuth (°) | Length (m) | X coordinate | Y coordinate | Z coordinate |
|---|---|---|---|---|---|---|
| 1 | 20.8756 | 178.9714 | 0.0542 | 0.0027 | 0.1492 | 0.6585 |
| 2 | 33.1760 | 172.8000 | 0.0645 | 0.0187 | 0.1480 | 1.3333 |
| 3 | 28.5824 | 162.5143 | 0.0607 | 0.0448 | 0.1423 | 1.7805 |
| 4 | 28.5824 | 162.5143 | 0.0607 | 0.0448 | 0.1423 | 1.9024 |
| 5 | 28.5824 | 172.8000 | 0.0607 | 0.0187 | 0.1480 | 2.1626 |
| 6 | 30.9344 | 172.8000 | 0.0626 | 0.0187 | 0.1480 | 3.2358 |
| 7 | 47.4563 | 170.7429 | 0.0780 | 0.0240 | 0.1473 | 3.5447 |
| 8 | 39.2567 | 174.8571 | 0.0699 | 0.0134 | 0.1486 | 3.7886 |
| 9 | 41.0791 | 166.6286 | 0.0716 | 0.0345 | 0.1452 | 3.7967 |

TABLE 1-continued

S2, 3D geological models and a drilling wellbore model are established based on parameters of the downhole fracture.

Figure 3A:
FIG. 3A-B show 3D geological models established in step S2 of Embodiment 1, where
Figure 3B:
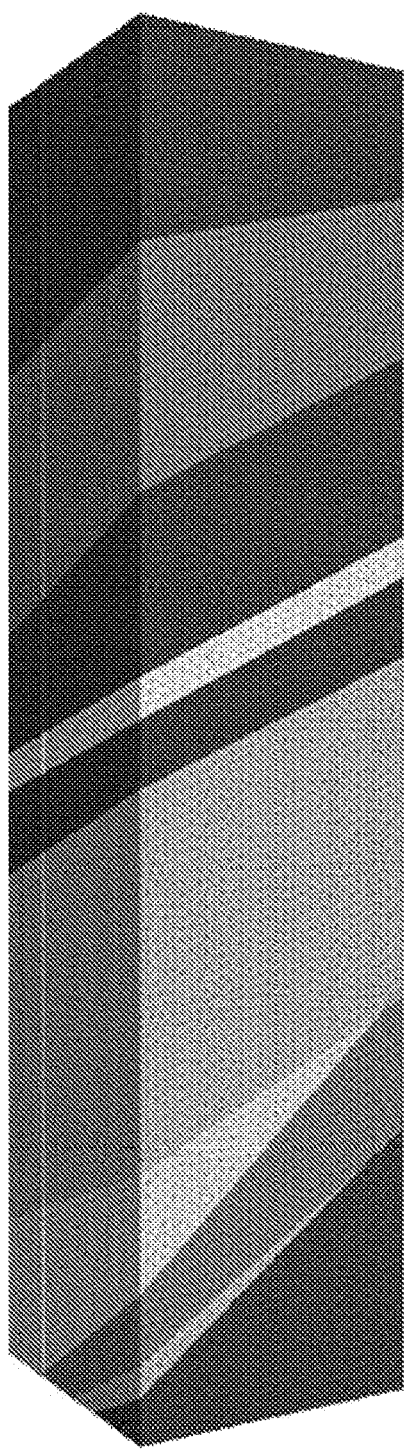

Firstly, the 3D drilling wellbore model is established by the ploy tunnel and delete range cy commands. The wellbore diameter is 0.075 m, and the cuboid size is 0.75×0.75×4 m. In step S1, 9 fractures are obtained. Therefore, the fracture model is established by repeating the Jset command for 9 times. Finally, tetrahedral grid division is used to divide the grid, the division size is 0.03 m, and gen function parameters are set. The fracture model is shown in FIG. 3A and the model is shown in FIG. 3B.

The 3DEC operation pseudo-code is as follows:

|   | 3DEC modeling pseudo-code or function | Description |
|---|---|---|
| 1 | Poly tunnel | Establish a 3D cuboid that meets the size |
| 2 | Delete range cy | Delete a cylinder and construct a wellbore model |
| 3 | Jset | Construct plane fractures with different occurrences |
| 4 | ... | Construct plane fractures with different occurrences |
| 5 | Jset | Construct plane fractures with different occurrences |
| 6 | gen | Grid division |
| 7 | Save model | Save a model |

S3, The model is assigned with material parameters, boundary conditions, and upper and lower bounds of an initial drilling fluid density, and accuracy is calculated.

Matrix rock parameters are as follows: an elastic modulus of 40 GPa, a density of 2,600 kg/m³, a Poisson's ratio of 0.21, a friction angle of 40°, tensile strength of 8.5 MPa, and cohesion of 30.64 MPa.

Fracture parameters are as follows: normal stiffness of 9 GPa and shear stiffness of 6 GPa.

Initial in-situ stress is as follows: maximum horizontal principal stress of 199 MPa, minimum horizontal principal stress of 137 MPa, and vertical stress of 206 MPa.

Boundary stress is as follows: maximum horizontal principal stress of 199 MPa, minimum horizontal principal stress of 137 MPa, and vertical stress of 206 MPa.

Displacement boundaries are as follows: xz plane yvel is 0, and yz plane xvel is 0.

Both an initial displacement and an initial velocity are 0.

Upper and lower bounds of an initial drilling fluid density are set as 2.09 g/cm³ and 0 g/cm³ and saved to the current program folder address. Solution accuracy of 0.01 is set.

The following 3DEC pseudo-code or function is executed:

|   | 3DEC modeling pseudo-code or function | Description |
|---|---|---|
| 1 | Property mat | Assign rock matrix parameters |
| 2 | Property jmat | Assign fracture parameters |
| 3 | Insitu stress | Assign initial in-situ stress |

-continued

| 3DEC modeling pseudo-code or function | | Description |
|---|---|---|
| 4 | Bound stress | Assign boundary stress |
| 5 | Bound stress | Assigned a bottom-hole pressure of drilling fluid |
| 6 | Bound xvel | Assign a displacement boundary |
| 7 | Ini disp | Assign an initial displacement |
| 8 | Ini xvel | Assign an initial velocity |

S4, The 3D geological models are solved using a discrete element method and stability of a well wall is determined.

The operation step is set as 2,000, and the well wall condition is that the unit centroid is less than 0.08 m. If the unit state is inelastic, the number of unit failures is counted. In the following 3DEC code, threshold1 is 0.08 and threshold2 is 1.

The following 3DEC pseudo-code or function is executed:

| 3DEC modeling pseudo-code or function | Description |
|---|---|
| 1 open | Read upper and lower bounds of a drilling fluid density |
| 2 Restore model | Call up an original model and a function in step S3 |
| 3 Step | Set an operation step |
| 4 Save model_result | Save a calculated model |
| Loop while | Loop through all computing units |
| 5 If zone(radius) < threshold1 | True if well wall conditions are met |
| 6 If zone(state) < threshold2 | True if the unit state meets the conditions |
| 7 Failure = Failure+1 | Determine a number of unit failures |
| 8 Endif | |
| 9 Endif | |
| 10 Endloop | End loop |

S5, Upper and lower bounds of a drilling fluid density are determined using dichotomy.

In this step, the model stability condition is that the number of unit failures is less than 10% of the total number of units, which is considered to meet the model stability condition. The following 3DEC pseudo-code or function is executed:

| 3DEC modeling pseudo-code or function | Description |
|---|---|
| 1 If condition | Model stability condition |
| 2 stability = 1 | Model stability is true |
| 3 Else | |
| 4 stability = 0 | Model stability is false |
| 5 end | |
| 6 If stability = 1 | If the well wall stability is true |
| 7 Pressureup=wellbore_Pressure | The upper bound of the drilling fluid density is equal to the current drilling fluid density of the model |
| 8 Pressuredown = Pressuredown | The lower bound of the drilling fluid density is equal to the lower bound of the current drilling fluid density of the model |
| 9 Else | If the well wall stability is false |
| 10 Pressureup= Pressureup | The upper bound of the drilling fluid density is equal to the upper bound of the current drilling fluid density of the model |
| 11 Pressuredown=wellbore_Pressure | The lower bound of the drilling fluid density is equal to the current drilling fluid density of the model |
| 12 Endif | |
| 13 Save .dat | Save the upper and lower bounds of the drilling fluid density |

S6, Steps S4 to S5 are repeated. The accuracy set is 0.01, and the upper and lower bounds of the drilling fluid density are 2.09 g/cm$^3$ and 0 g/cm$^3$. According to Equation (8), the number of repeated calculations is 7, and 7 copies of S4 and S5 codes are copied in the 3DEC code execution window.

The following 3DEC pseudo-code or function is executed:

| 3DEC modeling pseudo-code or function | Description |
|---|---|
| 1 S4 code | Execute S4 code for the 2nd times |
| 2 S5 code | Execute S5 code for the 2nd times |
| 3 ... | |
| 4 S4 code | Execute S4 code for the 7th times |
| 5 S5 code | Execute S5 code for the 7th times |

Figure 4A:
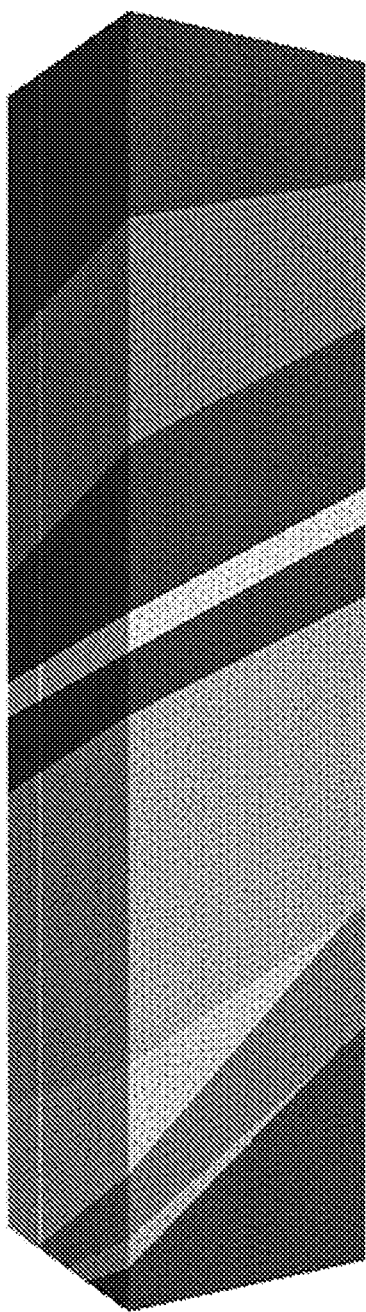
FIG. 4A-C show diagrams of operational results in Embodiment 1, where
Figure 4B:
Figure 4C:
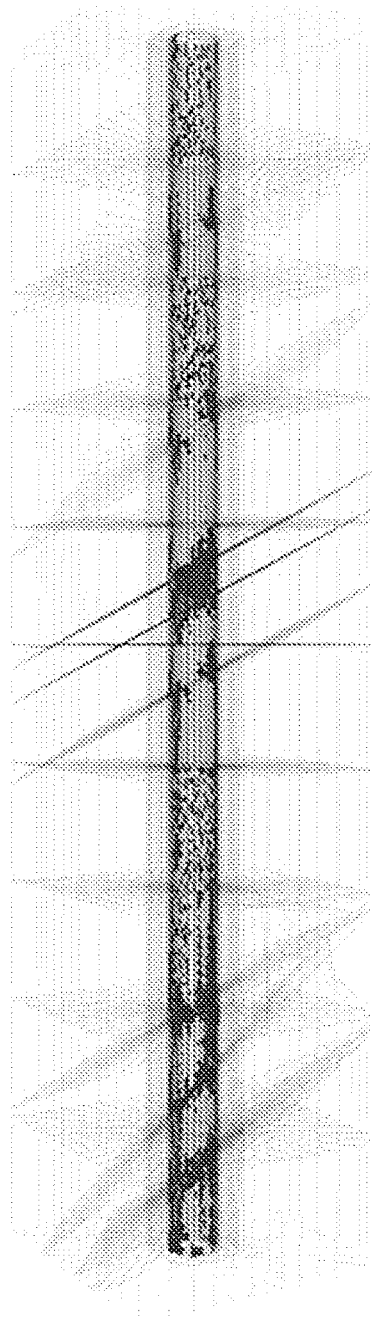

S7, After accuracy conditions are reached, the safe drilling fluid density is saved and output. The simulation results are shown in FIGS. 4A-C, and the final safe drilling fluid density is 1.36 g/cm$^3$.

The present disclosure can also calculate the safe drilling fluid density for the unfractured formation. The following takes the unfractured formation as an example to further describe the characteristics and performance of the present disclosure in detail.

Step S1, Image processing is performed to identify a downhole fracture.

Since there is no fractured formation, the first step can be defaulted.

S2, 3D geological models and a drilling wellbore model are established based on parameters of the downhole fracture.

By default of downhole fracture parameters, a 3D drilling wellbore model is directly established. The wellbore diameter is 0.075 m, and the cuboid size is 0.75×0.75×4 m. Tetrahedral grid division is used to divide the grid, and the division size is 0.03 m. Function parameters are set. The following 3DEC pseudo-code or function is executed:

| 3DEC modeling pseudo-code or function | Description |
| --- | --- |
| 1 Poly tunnel | Establish a 3D cuboid that meets the size |
| 2 Delete range cy | Delete a cylinder and construct a wellbore model |
| 3 gen | Grid division |
| 4 Save model | Save a model |

S3, The model is assigned with material parameters, boundary conditions, and upper and lower bounds of an initial drilling fluid density, and accuracy is calculated.

Matrix rock parameters are as follows: an elastic modulus of 40 GPa, a density of 2,600 kg/m3, a Poisson's ratio of 0.21, a friction angle of 40°, tensile strength of 8.5 MPa, and cohesion of 30.64 MPa.

Fracture parameters are as follows: normal stiffness of 9 GPa and shear stiffness of 6 GPa.

Initial in-situ stress is as follows: maximum horizontal principal stress of 199 MPa, minimum horizontal principal stress of 137 MPa, and vertical stress of 206 MPa.

Boundary stress is as follows: maximum horizontal principal stress of 199 MPa, minimum horizontal principal stress of 137 MPa, and vertical stress of 206 MPa.

Displacement boundaries are as follows: xz plane yvel is 0, and yz plane xvel is 0.

Both an initial displacement and an initial velocity are 0.

Upper and lower bounds of an initial drilling fluid density are set as 2.09 g/cm$^3$ and 0 g/cm$^3$ and saved to the current program folder address. Solution accuracy of 0.01 is set.

The following 3DEC pseudo-code or function is executed:

| 3DEC modeling pseudo-code or function | Description |
| --- | --- |
| 1 Property mat | Assign rock matrix parameters |
| 2 Property jmat | Assign fracture parameters |
| 3 Insitu stress | Assign initial in-situ stress |
| 4 Bound stress | Assign boundary stress |
| 5 Bound stress | Assigned a bottom-hole pressure of drilling fluid |

| 3DEC modeling pseudo-code or function | Description |
| --- | --- |
| 6 Bound xvel | Assign a displacement boundary |
| 7 Ini disp | Assign an initial displacement |
| 8 Ini xvel | Assign an initial velocity |

S4, The 3D geological models are solved using a discrete element method and stability of a well wall is determined.

The operation step is set as 2,000 times, and the well wall condition is that the unit centroid is less than 0.08 m. If the unit state is inelastic, the number of unit failures is counted. In the following 3DEC code, threshold1 is 0.08 and threshold2 is 1.

The following 3DEC pseudo-code or function is executed:

| 3DEC modeling pseudo-code or function | Description |
| --- | --- |
| 1 open | Read upper and lower bounds of a drilling fluid density |
| 2 Restore model | Call up an original model and a function in step S3 |
| 3 Step | Set an operation step |
| 4 Save model_result | Save a calculated model |
| Loop while | Loop through all computing units |
| 5 If zone(radius) < threshold1 | True if well wall conditions are met |
| 6 If zone(state) < threshold2 | True if the unit state meets the conditions |
| 7 Failure = Failure+1 | Determine a number of unit failures |
| 8 Endif | |
| 9 Endif | |
| 10 Endloop | End loop |

S5, Upper and lower bounds of a drilling fluid density are determined using dichotomy.

In this step, the model stability condition is that the number of unit failures is less than 10% of the total number of units, which is considered to meet the model stability condition. The following 3DEC pseudo-code or function is executed:

| 3DEC modeling pseudo-code or function | Description |
| --- | --- |
| 1 If condition | Model stability condition |
| 2 stability = 1 | Model stability is true |
| 3 Else | |
| 4 stability = 0 | Model stability is false |
| 5 end | |
| 6 If stability = 1 | If the well wall stability is true |
| 7 Pressureup=wellbore_Pressure | The upper bound of the drilling fluid density is equal to the current drilling fluid density of the model |
| 8 Pressuredown = Pressuredown | The lower bound of the drilling fluid density is equal to the lower bound of the current drilling fluid density of the model |
| 9 Else | If the well wall stability is false |
| 10 Pressureup= Pressureup | The upper bound of the drilling fluid density is equal to the upper bound of the current drilling fluid density of the model |
| 11 Pressuredown=wellbore_Pressure | The lower bound of the drilling fluid density is equal to the current drilling fluid density of the model |
| 12 Endif | |
| 13 Save .dat | Save the upper and lower bounds of the drilling fluid density |

S6, Steps S4 to S5 are repeated. The accuracy set is 0.01, and the upper and lower bounds of the drilling fluid density are 2.09 g/cm³ and 0 g/cm³. According to Equation (8), the number of repeated calculations is 7, and 7 copies of S4 and S5 codes are copied in the 3DEC code execution window.

The following 3DEC pseudo-code or function is executed:

| | 3DEC modeling pseudo-code or function | Description |
|---|---|---|
| 1 | S4 code | Execute S4 code for the 2nd times |
| 2 | S5 code | Execute S5 code for the 2nd times |
| 3 | ... | |
| 4 | S4 code | Execute S4 code for the 7th times |
| 5 | S5 code | Execute S5 code for the 7th times |

Figure 5A:
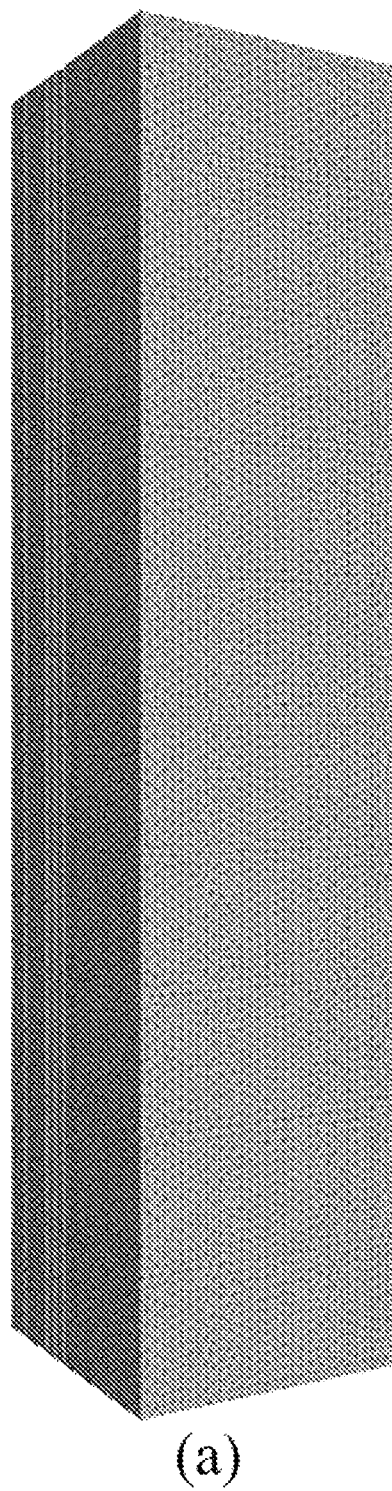
FIG. 5A-C show diagrams of operational results in Embodiment 2, where
Figure 5B:
Figure 5C:
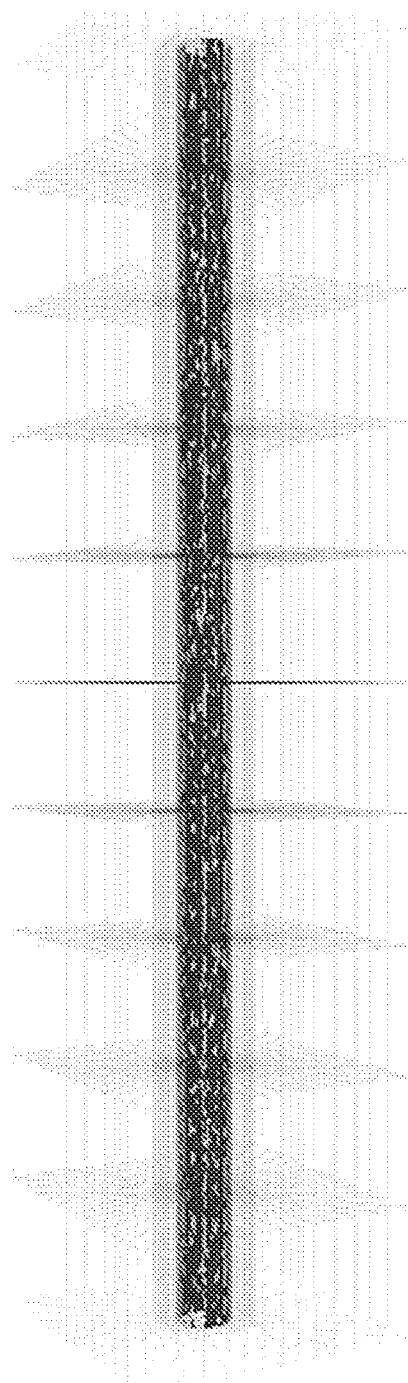

S7, After accuracy conditions are reached, the safe drilling fluid density is saved and output. The simulation results are shown in FIGS. 5A-C, and the final safe drilling fluid density is 0.74 g/cm³.

The basic principles, main features, and advantages of the present disclosure are shown and described above. Those skilled in the art should understand that the present disclosure is not limited by the above embodiments, and the descriptions in the above embodiments and specification are merely used for illustrating principles of the present disclosure. The present disclosure may have various modifications and improvements without departing from the spirit and scope of the present disclosure, and all these modifications and improvements should fall within the protection scope of the present disclosure. The claimed protection scope of the present disclosure is defined by the appended claims and equivalents thereof.

What is claimed is:

1. A method for calculating a safe drilling fluid density in a fractured formation, comprising the following steps:
   S1, converting, by a processor, a formation logging image into a gray image; processing, by a segmentation algorithm, the gray image to obtain a binary image; picking up and determining, by the processor, high and low point coordinates of a downhole fracture in the binary image to obtain parameters of the downhole fracture;
   S2, establishing three-dimensional (3D) geological models based on parameters of the downhole fracture, and establishing a drilling wellbore model based on a size and length of a wellbore;
   S3, assigning the model with material parameters, boundary conditions, and upper and lower bounds of an initial drilling fluid density by a 3-dimension distinct element code (3DEC), and calculating accuracy, wherein
   assigning formation with material parameters, comprising an elastic modulus, a Poisson's ratio, a density, a friction angle, cohesion and tensile strength; assigning the fracture with mechanical parameters, comprising normal stiffness and shear stiffness; assigning the model with the boundary conditions, comprising maximum horizontal principal stress, minimum horizontal principal stress, vertical stress, initial stress, a boundary displacement, and upper and lower bounds of the drilling fluid density; and setting solution accuracy of dichotomy to determine a number of iterations n, wherein an equation for the number of iterations is as follows:

$$|x^* - x_k| \leq \frac{(b-a)}{2^{k+1}} < \varepsilon, \quad (9)$$

wherein x* is true; $X_k$ is a calculated value of a k-th iteration; b is the upper bound of the drilling fluid density; a is the lower bound of the drilling fluid density; and ε is the solution accuracy;
   S4, solving the 3D geological models by the 3DEC to determine stability of a well wall:
   determining the drilling fluid density ρ by the 3DEC, wherein ρ is half the sum of the upper bound of the drilling fluid density and the lower bound of the drilling fluid density; setting a solution step and running the model until a maximum unbalance force remains unchanged or zero; and after software solution, determining whether a well wall unit meets stability conditions through processing, wherein decision conditions are set as follows:
   (1) if a centroid position of the unit is less than a position threshold 1, a number of yield units is less than a threshold 2;
   (2) if the centroid position of the unit is less than the position threshold 1, a maximum horizontal displacement of the well wall unit is less than a threshold 3; and
   (3) if the centroid position of the unit is less than the position threshold 1, the number of yield units is less than the threshold 2 and the maximum horizontal displacement of the well wall unit is less than the threshold 3;
   S5, determining upper and lower bounds of a drilling fluid density by the dichotomy, wherein
   according to the decision conditions, if the decision conditions are true, the upper bound of the drilling fluid density is a current drilling fluid density of the model, and the lower bound of the drilling fluid density is a lower bound of the current drilling fluid density of the model; if the decision conditions are false, the upper bound of the drilling fluid density is an upper bound of the current drilling fluid density of the model, and the lower bound of the drilling fluid density is the current drilling fluid density of the model; and the upper and lower bounds of the drilling fluid density are updated;
   S6, repeating steps S4 to S5;
   S7, after set accuracy conditions are reached, saving and outputting the safe drilling fluid density; and
   S8, guiding drilling engineering of the fractured formation according to the safe drilling fluid density.

2. The method for calculating a safe drilling fluid density in a fractured formation according to claim 1, wherein an equation of the high and low point coordinates and the parameters of the downhole fracture is as follows:
   a two-dimensional plane fracture equation is as follows:

$$z = Ax + By + C \quad (1),$$

wherein z is a height, in m; x and y are X and Y coordinates respectively; and A, B and C are plane control parameters;
   a wellbore equation is as follows:

$$\begin{cases} x = r\cos\theta \\ y = r\sin\theta \end{cases}, \quad (2)$$

wherein x and y are the X and Y coordinates respectively; r is a radius of the wellbore, in m; and θ is a round angle of a well, in rad;

a fracture curve function in a form of trigonometric function curve on the well wall is obtained by a sum of the equations, as shown in the following equation:

$$z = \sqrt{B^2 r^2 + A^2 r^2} \sin\left(\theta + \arctan\frac{A}{B}\right) + C, \tag{3}$$

wherein A, B and C are the plane control parameters; z is the height, in m; r is the radius of the wellbore, in m; and θ is the round angle of the well, in rad;

if the high point coordinates H(x0, y0) and the low point coordinates L(x1, y1) are given, the equation is rewritten as follows:

$$z(\theta) = \frac{y_0 - y_1}{2}\sin\left(\theta + \frac{\pi}{2} - x_0\right) + \frac{y_0 + y_1}{2}, \tag{4}$$

wherein θ is the round angle of the well, in rad; z is the height, in m; and x0 and y0 are the high point coordinates, and x1 and y1 are the low point coordinates; and a dip angle, azimuth, inclination and curve length in the parameters of the fracture are respectively shown in the following equations:

$$\alpha = \arctan\left(\frac{y_0 - y_1}{2r}\right), \tag{5}$$

$$\beta = \min(x_0, x_1), \tag{6}$$

$$\lambda = \beta + \frac{\pi}{2}, \text{ and} \tag{7}$$

$$l = \int_0^{2\pi} \sqrt{1 + (z')^2}\, dx, \tag{8}$$

wherein α is the dip angle, in rad; β is the azimuth, in rad; λ is the inclination, in rad; and l is the curve length, in m.

3. The method for calculating a safe drilling fluid density in a fractured formation according to claim 1, wherein step S2 is as follows: obtaining the parameters of the fracture through processing to construct a plane fracture model, and constructing the formation wellbore model by using the size of the wellbore, wherein the wellbore model is a cuboid wellbore model, and a wellbore radius of the wellbore model is the same as an actual wellbore radius; and a length of the cuboid wellbore model depends on a length of the model, a width of the cuboid wellbore model is greater than 3 times a wellbore diameter, and in order to meet the accuracy conditions and fast solution operation, a multiple is set to 5 times.

4. The method for calculating a safe drilling fluid density in a fractured formation according to claim 1, wherein step S6 is as follows: determining the drilling fluid density of the model according to the upper and lower bounds of the drilling fluid density; and recalling the model and performing steps S4 to S5 for n−1 times.

* * * * *